United States Patent [19]

Earle

[11] 3,865,962

[45] Feb. 11, 1975

[54] METHOD FOR PROVIDING A CONTINUOUS FILM OF ALGIN CONTAINING COATING MATERIAL SURROUNDING A RAW ONION PRODUCT

[76] Inventor: Roland D. Earle, P.O. Box 1209, Hollywood, Fla. 33022

[22] Filed: June 9, 1971

[21] Appl. No.: 151,565

Related U.S. Application Data

[63] Continuation of Ser. No. 669,272, Sept. 20, 1967, abandoned.

[52] U.S. Cl.................. 426/291, 426/293, 426/296, 426/303, 426/305, 426/310, 426/350, 426/378
[51] Int. Cl................................................ A23b 7/00
[58] Field of Search......... 49/1, 100, 103, 166, 168, 49/169, 193, 194, 195; 426/291, 293, 296, 303, 305, 310, 350, 378

[56] References Cited
UNITED STATES PATENTS

| | | | |
|---|---|---|---|
| 2,763,557 | 9/1956 | Helgerud | 99/169 |
| 2,992,925 | 7/1961 | Green | 99/100 |
| 3,078,172 | 2/1963 | Libby | 99/192 |
| 3,208,851 | 9/1965 | Antimon | 99/1 |
| 3,255,021 | 6/1966 | Earle | 99/195 |
| 3,395,024 | 7/1968 | Earle | 99/169 |
| 3,527,646 | 9/1970 | Scheick | 99/169 |
| 3,650,765 | 3/1972 | Smadar et al. | 99/168 |
| 3,650,766 | 3/1972 | Smadar | 99/168 |
| 3,676,158 | 7/1972 | Fisher | 99/168 |

Primary Examiner—Wilbur L. Bascomb, Jr.
Assistant Examiner—Martin G. Mullen
Attorney, Agent, or Firm—Markva & Smith

[57] ABSTRACT

A process for producing raw onion products which locks the sweet natural onion flavor therein is disclosed. The process broadly comprises the successive steps of preparing the onion product from onion that is in a raw condition. The raw onion product is dusted with a cold water amylaceous, insoluble material and subsequently coated with an algin containing dispersion. The algin containing coating is gelled in an aqueous calcium ion containing solution for a period of time sufficient to solidify substantially continuous, non-adherent film of the algin containing coating material around the raw onion. Subsequently the coated raw onion is dipped in batter. A thin layer of breading may be added followed by subsequent packaging and freezing thereof for storage or shipment. When ready to be used, the coated raw onion may be cooked in the usual manner.

The algin containing coating material surrounds the raw onion and retains most of the water and the sweet natural onion flavor of the onion during the cooking operation. In a specific embodiment, the algin containing coating is gelled to a raw onion ring in a substantially continuous film by a calcium gelling solution. The gelled coating surrounding the onion ring is sufficient support for subsequent batter and breading. The breading material used in conjunction with the raw onion should not be highly seasoned.

15 Claims, No Drawings

METHOD FOR PROVIDING A CONTINUOUS FILM OF ALGIN CONTAINING COATING MATERIAL SURROUNDING A RAW ONION PRODUCT

RELATED APPLICATION

This application is a continuation application of the parent application Ser. No. 669,272 filed Sept. 20, 1967 entitled METHOD FOR THE PREPARATION OF ONION RINGS AND PRODUCTS RESULTING THEREFROM, now abandoned.

BACKGROUND OF THE INVENTION

Onion products such as breaded onion rings are produced and consumed in large quantities. Notwithstanding the large public demand for this basic food commodity, no really satisfactory true onion flavor product of this kind has yet been marketed.

Several attempts have been made to provide the public with satisfactory onion products such as disclosed in U.S. Pat. Nos. 2,771,370, 3,078,172 and 3,208,851. The first patent is directed to a process for preparing a fried onion ring wherein it is necessary to have a partial pre-cooking step. In particular, the method includes a two-step cooking procedure with a freezing step between them. A smooth thick batter is mixed to a consistency which will stick to the onion rings and stay on. It has been found, however, that even though care is taken in mixing such smooth, thick batter, the batter will be driven off during cooking of the onion ring in deep fat. This basically is the reason why there has been no satisfactory true onion flavored product of this kind marketed. When the onion in a raw condition is battered and breaded and cooked in deep fat, the heat necessary to cook the onion blasts off most of the water in the onion together with the batter as well as the original onion flavor. To overcome this deficiency and to give the onion ring an onion flavor, the commercial producers add large quantities of seasoning containing onion flavor to the breading which surrounds the raw onion product. Consequently, the onion product does not give the sweet natural flavor of onion upon cooking, but rather onion seasoning applied to a tasteless piece of dry onion pulp.

The U.S. Pat. No. 3,078,172 discloses a frozen uncooked food product and the method of preparing same. The patentee has found that when frozen food products are thawed out, there is a considerable quantity of natural juices lost. In order to overcome the problem of the loss of juices during the thawing procedure, the patentee first coats the uncooked food with an edible sealing material such as flour or batter. A second coating is then applied with an edible cooking material such as oil or fat at a temperature that will maintain the cooking material in a fluid condition but keep the food itself uncooked. Once the frozen food product has been covered with flour and/or batter, it may optionally be coated with bread crumbs or other coating materials. The flour, batter and bread crumbs constitute the breading in this patent. Experience has shown that in order to completely cover raw onion products such as a raw onion ring with breading material, large quantities of breading must be used. Where only small quantities of breading are used, it flakes off or splits away from the raw onion during the subsequent cooking operation. This flaking away of the breading itself produces an inferior product.

In U.S. Pat. No. 3,208,851, the patentees are concerned with the production of an improved batter mix which is applied as a coating during the preparation of breaded, deep fried foods. The patentees use an amylaceous material which has been subjected to a dry oxidation process in their batter mixes. The amylaceous material is mixed in as a part of the batter mix composition so that there is a tenacious adherence of the breading to the foodstuff itself. In other words, this is another standard breading process known in the prior art which takes a considerable amount of breading and is still subject to being driven off by the water inside the raw onion when it is cooked. Raw onion products such as onion rings produced by these present production means contain breading material representing from 25 to 150 percent by weight of the original raw onion. Therefore, most of the onion product itself represents breading.

The particular problem associated with raw onions is that they bleed and exude an oily substance. This oily substance makes the raw onion difficult to work with. This is particularly true in any coating step associated with raw onions. This particular problem has not been recognized, faced nor solved by anyone heretofore in the prior art. Attempts have been made to coat raw onion products in accordance with an earlier U.S. Pat. No. 3,255,021 of which I was a named inventor. However, in the presence of the oily substance exuded from the raw onion, these attempts to coat the raw onion rings have resulted in failure. The coating material simply forms small balls on the surface of the raw onion and no continuous film surrounding the raw onion can be produced. The exuding of the oily substance in raw onion is an obvious deleterious effect which must be obviated to effect the desired coating process.

PURPOSE OF THE INVENTION

It is a primary object of my invention to provide a high-grade, edible onion product suitable for human consumption and a commercially acceptable process for producing same.

Another object of my invention is to provide an onion product wherein the sweet natural onion flavor is retained therein after it has been cooked.

It is a further object of my invention to provide an onion product where most of the water and the sweet natural flavor are retained after cooking.

A still further object of my invention is to provide an onion product without the use of any artificial onion seasoning therein.

Another object of this invention is to overcome the problem of coating a raw onion product with batter and/or breading without same being blasted off during the cooking operation.

SUMMARY OF THE INVENTION

These objects and other advantages are accomplished through the use of a process which has a very specific sequence of operative steps. An edible, cold water insoluble amylaceous material inclusive of edible farinaceous materials, is first applied to the raw onion material such as a raw onion ring. The edible, cold water insoluble material is applied in amounts effective to form a thin layer over the entire outside surface of the raw onion material. It has been found by the simple application of this cold water insoluble edible amylaceous material to the onion ring that the coating which forms small balls when placed directly on the surface of the raw onion could be made to completely surround the oily onion. That is, a substantially continuous film is now produced where it could not be formed in previous attempts. It is emphasized that the specific coating of this invention does not adhere to the onion ring. That is, the dusting material permits the formation of a substantially continuous film around the ring. In other words, there is a self-supporting coating that is contiguous to the raw onion material but does not adhere tenaciously thereto.

After coating with the cold water insoluble, edible material, each raw onion portion is completely immersed in an aqueous dispersion containing water soluble algin. The raw onion portion is then removed from the dispersion and treated with a calcium containing gelling agent. The algin coated onion portion is treated in the gelling agent for a period of time sufficient to solidify a substantially continuous, non-adherent film of the algin containing coating material therearound without imparting any bitter taste thereto when the onion is consumed after cooking.

The raw onion product which has been treated as set forth hereinabove may then be dipped in a batter material and subsequently coated with a layer of breading. The breaded onion product may be frozen for storage or shipment and when ready to be served, the prepared onion product is cooked in the standard manner. The raw onion product as produced in accordance with the process of this invention is a complete product since it is ready for subsequent processing when desired.

DESCRIPTION OF SPECIFIC EMBODIMENTS

When cooked, the raw onion product such as onion rings, produced through the process of this invention, are far superior to onion products made by available prior art methods. They are sweet and moist and have a true delicate onion flavor with a minimum of breading without the addition of any onion salt or onion flavoring. Although any raw onion product may be produced through the use of my invention, the specific embodiments discussed hereinbelow are directed to raw onion rings which have been first cut from a raw onion in the usual manner.

Most any finely divided cold water insoluble amylaceous dusting material inclusive of farinaceous materials may be used; however, an edible dusting material should be employed. In the following specific embodiments are used amylaceous materials such as flour, starch or mixtures thereof. Examples of such materials are: wheat flour, corn starch, potato starch, rice starch, corn flour, soya flour, etc., or combinations thereof. The cold water insoluble dusting material is used in amounts effective to form a thin layer over the entire outside surface of the raw onion ring. This amount is generally small compared to the weight of the onion ring to be subsequently coated with the algin containing continuous film. In a specific embodiment used to effect the commercial operation of my process, a small amount of vegetable oil is incorporated in the dusting material thereby avoiding the release of large amounts of the finely divided dusting material to the atmosphere.

The algin coating composition for use in the process of this invention can be prepared by adding water soluble algin to pure drinking water. Any water soluble algin that will gel with calcium salts such as sodium, potassium and ammonium salts of alginic acid may be used. Sodium alginate in its less degraded form; namely,, the high viscosity grades, is generally used in the specific embodiments of this invention.

While algin alone may be used satisfactorily for the coating composition, a filler material may be employed with the algin. Any edible filler may be used for this purpose. Examples of filler materials that have been used are: carbohydrates comprising monosaccharides or polysaccharides and mixtures thereof. More specifically, dextrose, malto dextrin, sorbitol or corn syrup solids may be used in this process. When algin alone is used, the coating composition is prepared by adding water soluble algin to pure drinking water at room temperature.

The water soluble algin is added until the resulting composition has a viscosity in the range of 100 to 300 centipoises at room temperature. Where a filler material is used with the algin, an appropriate relationship from about 2½ to 20 parts by dry weight of the water soluble algin to about 97½ to 80 parts by dry weight of the filler material is employed. The mixture of algin and filler is then dissolved in a sufficient quantity of pure drinking water to produce an aqueous dispersion having a viscosity between 100 and 1000 centipoises at room temperature.

If the viscosity of the dispersion is too low, the coating on the onion ring will be too thin and weak and will not withstand the conditions normally encountered in handling and shipping. If, on the other hand, the viscosity is too high, the resulting coating will be too thick and gummy. This latter condition represents a waste of valuable material without producing any beneficial effects. Furthermore, one eating the food so coated becomes aware of the coating substance which otherwise would not be noticeable had the food been coated in accordance with the viscosity range specified hereinabove.

Coating substances used in the specific embodiments of this invention are obtained by mixing 10 parts of high viscosity sodium alginate with 90 parts of malto dextrin. The sodium alginate is commercially referred to as Kelco Gel HV obtained from the Kelco Company, Clark, N.J. The malto dextrin may be the product No. F-13-102 of the A. E. Staley Manufacturing Co., Decatur, Ill., having a dextrose equivalent number of DE 15-17. Ten (10) parts by weight of this mixture is then dissolved in 90 parts by weight of pure drinking water at room temperature. The resultant aqueous coating dispersion has a viscosity of between 150 and 350 centipoises at room temperature.

Having prepared the aqueous coating dispersion, the dusted onion ring at substantially room temperature is immersed therein so that the entire surface area of the onion ring is covered by the coating material. The coated onion ring is then removed from the aqueous dispersion and any excess material is permitted to drain therefrom. The onion ring is then subjected to aqueous gelling solution containing a water soluble source of calcium ion; such as, calcium chloride, calcium gluconate, calcium acetate, calcium propionate, calcium lactate, etc. The onion ring coated with the algin dispersion should remain in the gelling solution for a period of time sufficiently long to form a substantially continuous film around the onion ring. The film should be strong enough to prevent cracking and breaking during the subsequent handling and shipping operations. However, immersion in the gelling solution should not be so long a time as to cause bitterness in the cooked onion ring.

In general, the retention time of the coated onion ring in the gelling solution depends on the concentration of the calcium in the solution, the stronger the solution the less retention time required. For example, a firm gel can be produced using 0.5 molar solution of calcium chloride with a retention time of 30 seconds. No bitter taste results and the film is strong enough to be handled without cracking or breaking within 30 seconds' time. Care must be exercised in using concentrated ion gelling solutions, since the higher the concentration of calcium the greater the possibility of imparting a bitter taste to the cooked onion ring.

In many commercial operations the gelling time of thirty seconds is considered too long. However, the use of more concentrated calcium ion gelling solutions requires too much care for routine operations (i.e., skilled technicians and timing devices). It has been found that the gelling time can be greatly reduced by adding an edible gum or gum-like thickening agent to the clacium ion gelling solution in sufficient quantities to give the gelling composition a Brookfield viscosity of between 5 and 250 centipoises, preferably 5 to 100 centipoises at room temperature. A firm strong alginate film is formed surrounding the onion ring almost instantly without imparting bitterness on dipping the algin coated onion ring into the bath. When using a gum or gumlike thickener, the time of immersion is not critical. The onion product may remain in the solution for less than 5 seconds and produce a satisfactory result. However, as the visocity of the gelling solution or bath increases possibility of imparting bitterness to the onion ring increases.

A specific embodiment of a gelling formula for coating onion rings in accordance with this invention is made by dissolving 29.5 grams of Hercules Powder Company's carboxymethyl cellulose gum, medium viscosity No. 7 MCF, in 3640.5 grams of pure drinking water. To the resultant mixture is then added 304.5 grams of Mallinckrodt Chemical Company's No. 4152 food grade calcium chloride. The gelling solution so produced has a viscosity of approximately 20 centipoises at room temperature.

After the raw onion ring has been substantially completely surrounded by the film, it is removed from the gelling solution. The gelling solution may contain a gum thickener if desired. Any excess material remaining thereon is allowed to drain. The onion ring is now ready to be dipped in a conventional batter solution, such as, Pillsbury's Extra Light Pancake Mix, or any well known batter material. A batter material may be prepared by stirring 218.75 grams of Pillsbury's Extra Light Pancake Mix into 431.0 grams of pure drinking water. The raw, alginate coated onion ring is then covered with the batter material by dipping, spraying or by other means. After covering with batter, there is applied to the onion ring a light layer of breading. The breading material should not contain spices; otherwise, the natural sweet onion flavor will be overpowered by the added strong spicy seasonings.

The thickness of the breading material placed on the onion ring prepared in accordance with my process should represent no more than 75 percent by weight of the onion ring. The batter and breading adheres to the algin containing coating which surrounds the onion ring without having to place excessive amounts thereon. Consequently, when eaten, the onion rings prepared in accordance with my process are a superior product. This product contains more onion material and much less breading than produced under present day commercial methods.

After the breading step, the onion ring is then packaged and then frozen for storage or shipment. When ready to be eaten, the frozen onion ring is cooked, generally by deep frying, for about 2 minutes at a temperature of between 350° and 375°F. Onion rings prepared in accordance with my invention are far superior to onion rings presently being marketed. The original sweet onion flavor is retained. The onion ring is moist, is covered with only a minimum amount of breading, and does not require the use of spicy seasonings.

SPECIFIC EXAMPLES

The following examples are given to further illustrate my invention, but are not to be construed to limit the scope thereof:

EXAMPLE I

A raw onion ring was prepared from a raw onion by cutting in the usual manner. The onion ring was then dusted with Gold Medal enriched wheat flour, applying a thin layer over the outside surface. A coating dispersion solution was prepared by dissolving 1.4 percent sodium alginate solids (Kelco-Gel HV, Kelco Co., Clark, N.J.) in pure drinking water. The resulting aqueous alginate dispersion had a viscosity of approximately 200 centipoises at room temperature. The dusted onion ring was immersed in the sodium alginate solution, removed and the excess permitted to drain therefrom. The alginate coated onion ring was then dipped in an instant gel solution which had previously been prepared by dissolving 304.5 grams of calcium chloride dihydrate, food grade, in 3640.0 grams of pure drinking water which had been previously thickened with 29.5 grams of carboxymethyl cellulose (Hercules Powder Co. medium viscosity cellulose gum type 7 MCF) dissolved therein. The onion ring was removed from the gelling solution, allowing any excess material to drain therefrom. The onion ring, upon inspection, was encased in substantially a continuous gelled alginate film or coating. The coated onion ring was then dipped in a batter solution made by stirring 218.75 grams of Pillsbury Extra Light Pancake Mix into 431.0 grams of pure drinking water. Breading material was lightly added to the battered onion ring. The resulting onion ring was then packed and frozen, in which form it was ready for marketing.

Several days thereafter the frozen onion ring was cooked by deep frying for two minutes at a temperature of between 350° and 375°F. The cooked onion ring so produced had a sweet natural onion flavor, was moist, has a pleasing and appetizing appearance without an excess amount of breading material.

EXAMPLE II

A raw onion ring was prepared as in Example I, except that the onion ring was coated with a dispersion solution containing a mixture of malto dextrin and sodium alginate in the following proportions: 382.0 grams of malto dextrin having a dextrose equivalent of approximately 12 to 15 (A. E. Staley Mfg. Co., Decatur, Ill., product F-13-102) and 42 grams of sodium alginate (Kelco Gel HV, Kelco Co., Clark, N.J.) was dissolved in 3640.0 grams of pure drinking water, the resulting solution having a viscosity of about 205 centipoises at room temperature. The same high quality product as produced in Example I was obtained upon cooking.

EXAMPLE III

A raw onion ring was prepared as in Example I, except that the onion ring was coated with a dispersion solution containing a mixture of dextrose and sodium alginate in the following proportions: 90.0 grams of dextrose and 10 grams of sodium alginate was dissolved in a sufficient quantity of pure drinking water (approximately 900.0 grams) to bring the viscosity of the solution to approximately 200 to 250 centipoises at room temperature. The coating produced from this material was firm and strong and upon being cooked gave the same high quality product as produced in Example I.

EXAMPLE IV

A raw onion ring was prepared as in Example III, except that instead of using 90 grams of dextrose, 90 grams of sorbitol was substituted, all other conditions being the same. Upon cooking, the same high quality product was obtained.

EXAMPLE V

A raw onion ring was prepared as in Example III above, except that instead of using 90 grams of dextrose, 90 grams of corn syrup solids was used, all other conditions being the same. Upon cooking, the onion ring so produced gave the same high quality product as was obtained in Example III.

EXAMPLE VI

A raw onion ring was prepared as in Example II, except that the onion ring was coated with a dispersion solution containing a mixture of potato starch and sodium alginate in the following proportions: 40.0 grams of potato starch and 0.8 gram of sodium alginate (Kelco Gel HV, Kelco Co., Clark, N.J.) was dispersed in a sufficient quantity of pure drinking water (approximately 178.0 grams) to bring the viscosity of the solution to approximately 300 centipoises at room temperature, all other conditions being the same. The same high quality onion ring was produced upon cooking.

It is not intended to limit the invention herein disclosed to dipping or immersing the onion ring to be produced. Spraying or any other method of covering the onion ring is contemplated by this disclosure.

While the preparation of raw onion products and products resulting therefrom have been shown and described in detail, it is obvious that this invention is not to be considered as being limited to the exact form disclosed, and that changes in detail and construction may be made therein within the scope of the invention without departing from the spirit thereof.

Having thus set forth and disclosed the nature of this invention, what is claimed is:

1. A method for preparing a raw onion product comprising the steps of:
   a. applying an edible, cold water insoluble finely divided amylaceous material to a raw onion portion in amounts effective to form a thin layer over the entire outside surface of the raw onion portion,
   b. then immersing each insoluble material coated raw onion portion in an aqueous dispersion containing water soluble algin,
   c. removing each onion portion from the dispersion, and
   d. treating each algin coated onion portion with an aqueous calcium ion containing gelling solution for a period of time sufficient to solidify a substantially continuous film of the alging containing coating material surrounding the onion portion without imparting any bitter taste thereto when the onion portion is consumed.

2. A method as defined in claim 1 wherein said raw onion portion comprises a raw onion ring which has been cut from a whole raw onion.

3. A method as defined in claim 1 wherein said edible, cold water insoluble material is in a dry finely divided form.

4. A method as defined in claim 1 wherein the amylaceous material is a ferinaceous material.

5. A method as defined in claim 1 wherein the amylaceous material is flour, starch or combinations thereof.

6. A method as defined in claim 1 wherein said treating step is effected by immersing the onion product in said gelling solution.

7. The method as defined in claim 1 wherein the algin coated raw onion portion is dipped in a batter material and breaded by applying a thin layer of breading material thereon.

8. The method as defined in claim 7 wherein the breaded raw onion portion is frozen.

9. The method as defined in claim 1 wherein the water soluble algin comprises sodium alginate.

10. The method as defined in claim 1 wherein the gelling solution comprises calcium chloride, and the algin coated onion portion is treated by immersing in said gelling material.

11. The method as defined in claim 1 wherein the aqueous dispersion comprises a water soluble algin and a carbohydrate consisting of at least one sugar selected from the group of monosaccaharides and polysaccharides dissolved in pure drinking water so that the dispersion solution has a viscosity of between 100 and 1000 centipoises at room temperature.

12. The method as defined in claim 1 wherein the aqueous dispersion comprises a water soluble algin and sorbitol.

13. The method as defined in claim 1 wherein the aqueous dispersion comprises sodium alginate and malto dextrin in the respective portions of 2½ to 20 parts by dry weight of sodium alginate and 97½ to 80 parts by dry weight of malto dextrin.

14. The method as defined in claim 1 wherein the gelling material comprises calcium chloride and a gum thickener.

15. The method as defined in claim 1 wherein the gelling material comprises calcium chloride and carboxymethyl cellulose gum.

* * * * *